(12) United States Patent
Huang et al.

(10) Patent No.: US 6,700,784 B2
(45) Date of Patent: Mar. 2, 2004

(54) HANDHELD TYPE ELECTRONIC DEVICE

(75) Inventors: San-Shan Huang, Kaohsiung (TW); Hung-Chuen Yin, Chiangsu (CH)

(73) Assignee: Molex Incorporated, Lisle, IL (US)

( * ) Notice: Subject to any disclaimer, the term of this patent is extended or adjusted under 35 U.S.C. 154(b) by 0 days.

(21) Appl. No.: 10/262,910

(22) Filed: Oct. 2, 2002

(65) Prior Publication Data

US 2003/0123232 A1 Jul. 3, 2003

(30) Foreign Application Priority Data

Sep. 28, 2001 (TW) .................................. 90216760 U

(51) Int. Cl.⁷ ................................................. H05K 7/20
(52) U.S. Cl. ...................... 361/715; 361/797; 361/752; 439/165; 455/128
(58) Field of Search ................................ 361/681, 752, 361/797, 748, 789; 439/165; 455/90, 128

(56) References Cited

U.S. PATENT DOCUMENTS 5,978,210 A * 11/1999 McCrary .................... 361/680
5,995,373 A * 11/1999 Nagai ......................... 361/755
6,011,699 A    1/2000 Murray et al. .............. 361/814

* cited by examiner

Primary Examiner—Randy Gibson
Assistant Examiner—Hung Bui
(74) Attorney, Agent, or Firm—Stephen Z. Weiss

(57) ABSTRACT

A handheld type electronic device of this invention includes two housings respectively provided with electronic system components, a rotary device, and an electrical connector electrically connecting the electronic system components in the two housings. The invention is characterized in that the rotary device has a pivoting portion disposed on one side of one of the housings to rotatably connect with the other one of the housings, and a receiving portion. The electrical connector is disposed in the receiving portion and is confined in the housing provided with the rotary device such that rotation of the pivoting portion can bring the two housings to open or close while the electrical connector remains immovable.

10 Claims, 11 Drawing Sheets

Prior Art

Prior Art

Prior Art

Prior Art

HANDHELD TYPE ELECTRONIC DEVICE

FIELD OF THE INVENTION

This invention relates to a handheld type electronic device, more particularly to a handheld type electronic device which include two housings that are foldable toward each other.

DESCRIPTION OF THE RELATED ART

In order to facilitate carrying by users, electronic devices are constantly being reduced in size and weight, especially for handheld type electronic devices, such as mobile phones, palm-tops, compact type computers, personal digital assistants, etc. Currently, one way to reduce the size of a handheld type device is to provide more than one housing that contains an operating circuit. That is, a housing which is rotatable and which is foldable onto another housing is provided to thereby reduce the size of the handheld electronic device in a folded state (i.e. the two housings are stacked, with one top of the other). When it is desired to operate the electronic device, it is only necessary to pull the two stacked housings apart from each other. Such kind of handheld type electronic device includes the flip-type mobile phone illustrated in FIG. 1.

However, in using this kind of handheld type electronic devices, the operating circuits concealed within the two separate housings have to be able to communicate with each other. Technical means adopted to enable the operating circuits within the two housing in these handheld type electronic devices to electrically connect with each other include the use of cables, switches, flexible print circuits (FPC), etc. For the sake of better understanding, several conventional means are disclosed and described in the succeeding paragraphs. Since these conventional means are substantially the same in construction when applied to these handheld type electronic devices, for the sake of illustration, mobile phones employing these conventional means are set forth hereinbelow as examples. It should be apparent to those skilled in the art that these conventional means may also be applied to other flips of handheld electronic devices. FIG. 1 is a schematic view of a conventional flip-type mobile phone that uses a cable. The mobile phone 10 has a first housing 100, a second housing 101 and a hinge 102 which enables the second housing 101 to rotatably connect with one side of the first housing 100. The first housing 100 has a keypad portion 103, a microphone 104 and an operating circuit (not shown) built in the first housing 100. The second housing 101 has an earphone 105. To establish electrical connection between the operating circuit within the first housing 100 with the earphone 105 in the second housing 101, a cable 106 is required to pass through the hinge 102 between the two housings 100, 101 so that the two ends thereof are respectively and electrically connected to the operating circuit and the earphone 104. However, as the hinge 102 will rotate when the second housing 101 rotates relative to the first housing 100, the cable 106 passing through the hinge 102 will be pulled and twisted as a result. Hence, after a period of time of use, poor electrical contact between the cable 106 and the operating circuit or earphone 105 is likely to result, thereby shortening the service life of the mobile phone.

FIG. 2 shows another conventional flip-type mobile phone 11 that utilizes a switch. The mobile phone 11 also includes a first housing 110, a second housing 111 and a hinge 112 that pivots the first housing 110 to the second housing 111 and that enable the two housings 110, 111 to rotate relative to each other. The first housing 110 has a keypad portion 113, a liquid display 114, a speaker portion 115, and an operating circuit 116. The second housing 111 has a microphone 117. The hinge 112 of the mobile phone 11 includes a first pivot shaft 1121 disposed in the middle of the side of the junction of the first housing 110 and the second housing 111, and second pivot shafts 1122 disposed on the second housing at both sides of the first pivot shaft 1121. In the mobile phone 11, a switch 118 for electrically connecting the operating circuits 116 which are respectively disposed in the two housings 110, 111 includes a first connector 1180 disposed in one of the second pivot shafts 1122 and moved with the second pivot shafts 1122, and a switch 1181 with a rotary connector, which is disposed in the first pivot shaft 1121 and which abuts against the first connector 1180. As shown in FIG. 3, the switch 1181 with the rotary connector includes an L-shaped mounting member 1182, an insulating plate 1183 positioned on the mounting member 1182, two contact portions 1184 juxtaposed and positioned on the surface of the insulating plate 1183, a second connector 1185 abutting against the surface of the insulating plate 1183 that is provided with the contact portions 1184 and rotatable relative thereto, and a substantially rectangular metal frame 1186 sleeved on the second connector portion 1185. The two contact portions 1184 each have one end portion exposed from the surface of the insulating plate 1183 to form an elastic arm, and another end which is bent downwardly to extend through the mounting member 1182. The second connector 1185 has a cylindrical retaining member 1187 formed from an insulating material, a male connecting terminal 1188 mounted one surface of the retaining member 1187, and movable contact portion 1189 formed on the other surface of the retaining member 1187 and electrically connected to the male connecting terminal 1188. The movable contact portion 1189 has an area smaller than that of the surface of the retaining member 1187 such that the male connecting terminal 1188 will be electrically connected to the contact portion 1184 via the movable contact portion 1189 only when the retaining member 1187 is at a predetermined rotational angle. The first connector 1180 has a female connecting terminal to match the male connecting terminal 1188 of the second connector 1185. Furthermore, as shown in FIG. 2, when the first and second housings 110, 111 are interconnected via the hinge 112, the second connector 1185 will fit into the first connector 1180 so that the connecting terminals 1188 of both of them are electrically connected to each other and achieve linking-up. The connecting terminals of the first connector 1180 are further connected electrically to the microphone 117, and the ends of the contact portions 1184 which extend through the mounting member 1182 are also electrically connected via lead wires 119 to the operating circuit 116, whereby the angle of the mobile phone in an opened state during use can be set to be a predetermined angle of the movable contact portion 1189 which connects electrically with the contact portions 1184. As such, when the mobile phone 11 is opened, the first pivot shaft 1121 rotates relative to the second pivot shaft 1122 so as to bring the movable contact portion 1189 of the second connector 1185 to move along the insulating plate 1183 and to connect electrically with the contact portion 1184 upon rotating about a predetermined angle, thereby permitting electrical connection between the microphone 117 and the operating circuit 116. In addition, the switch 118 is generally used as a power switch. When the operating circuit 116 detects electrical connection of the switch 118 (i.e., the mobile phone 11 is opened to the predetermined angle so that the second connector 1185 is electrically connected to the contact portions 1184), the mobile phone is automatically switched on; otherwise, the mobile phone is switched off, thereby achieving the object of user convenience. However, the switch 1181 with the rotary connector also has the disadvantage of limited service life as encountered in the aforesaid mobile phone 10. This is because when the mobile phone 11 is in use, the movable contact portion 1189 will rub against the contact portions 1184 due to rotation thereof to result in wear, and poor contact between the movable contact portion 1189 and the contact portions 1184 often results after several times of use.

Further, reference is made to FIGS. 4 and 5, which show a mobile phone 12 that employs a soft bus (disclosed in U.S. Pat. No. 6,011,699). The mobile phone 12 also includes a first housing 121 having a keypad portion 1211 and an operating circuit (not shown), a second housing 122 having a speaker 1221, a display 1222 and an operating circuit 1223 (see FIG. 5), and a hinge member 123 that pivots the second housing 122 to one side of the first housing 121. The hinge member 123 includes a first pivot shaft 1231 disposed on one side of the junction of the second housing 122 and the first housing 121 in a middle position, two second pivot shafts 1232 disposed on the first housing 121 at both sides of the first pivot shaft 1231, and shaft 1234 insertable via an opening 1233 in the first pivot shaft 1231 into the first pivot shaft 1231 to be in tight fit with the first pivot shaft 1231. In this mobile phone 12, to enable electrical connection of the operating circuit 1223 in the second housing 122 to the operating circuit in the first housing 121, a flexible print circuit 1224 for signal transmission is disposed to extend from one side of the operating circuit 1223, and an open slot 1235 is provided in the first pivot shaft 1231 adjacent to a mounting shaft 1234. The shaft 1234 is provided with a shaft slot 1236, and an open slot 1237 is provided in the first housing 121 to correspond to the shaft slot 1236. As such, the flexible print circuit 1224 is extended, in sequence, through the open slot 1235 in the first pivot shaft 1231, the opening 1233 in the first pivot shaft 1231, the shaft slot 1236 in the shaft 1234, and the open slot 1237 in the first housing 121 to thereby establish electrical connection between the operating circuits in the first housing 121 and the second housing 122. However, when the second housing 122 rotate relative to the first housing 121, as the shaft 1234 will rotate relative to the second pivot shaft 1232, the flexible print circuit 1224 which shuttles around the hinge member 123 will be pulled and twisted so that the poor contact problem associated with the aforesaid conventional connecting members will also arise to limit the service life of the mobile phone 12.

In the aforesaid conventional flip-type mobile phones 10, 11, 12, the occurrence of poor contact in the circuit components 106, 118, 1224 electrically connecting the operating circuits respectively disposed in the two housings is mainly due to co-rotation with the pivot shafts 102, 112, 123 and consequent movement therewith. Therefore, if the circuit components of the operating circuits in the two housings can be bridged so as not to rotate with the pivot shafts and not to be moved therewith, the occurrence of poor contact between the circuit components and the operating circuits resulting from repeated operations can be avoided, thereby resolving the problems encountered in the prior art and prolonging the service life of electronic devices.

SUMMARY OF THE INVENTION

Therefore, an object of the present invention is to provide a handheld electronic device that can achieve stable electrical connection between electronic system components respectively disposed in two housing thereof.

Accordingly, a handheld type electronic device of this invention includes first and second housings accommodating first and second electronic system components therein, a rotary device and an electrical connector. The rotary device includes a pivoting portion and a receiving portion. The pivoting portion is disposed on one side of the second housing and is rotatably connected to a corresponding side of the first housing. The electrical connector includes an insulating casing which has a plurality of terminal channels disposed therein to receive terminals, each of the terminals having at least one first contact portion and at least one second contact portion to respectively and electrically connect with the second electronic system component and the first electronic system component, the electrical connector being disposed in the receiving portion of the rotary device and being confined within the first housing such that, when the second housing rotates relative to the first housing via the pivoting portion of the rotary device, the electrical connector which is confined within the first housing will not rotate therewith

DETAILED DESCRIPTION OF THE PREFERRED EMBODIMENTS

Figure 1:
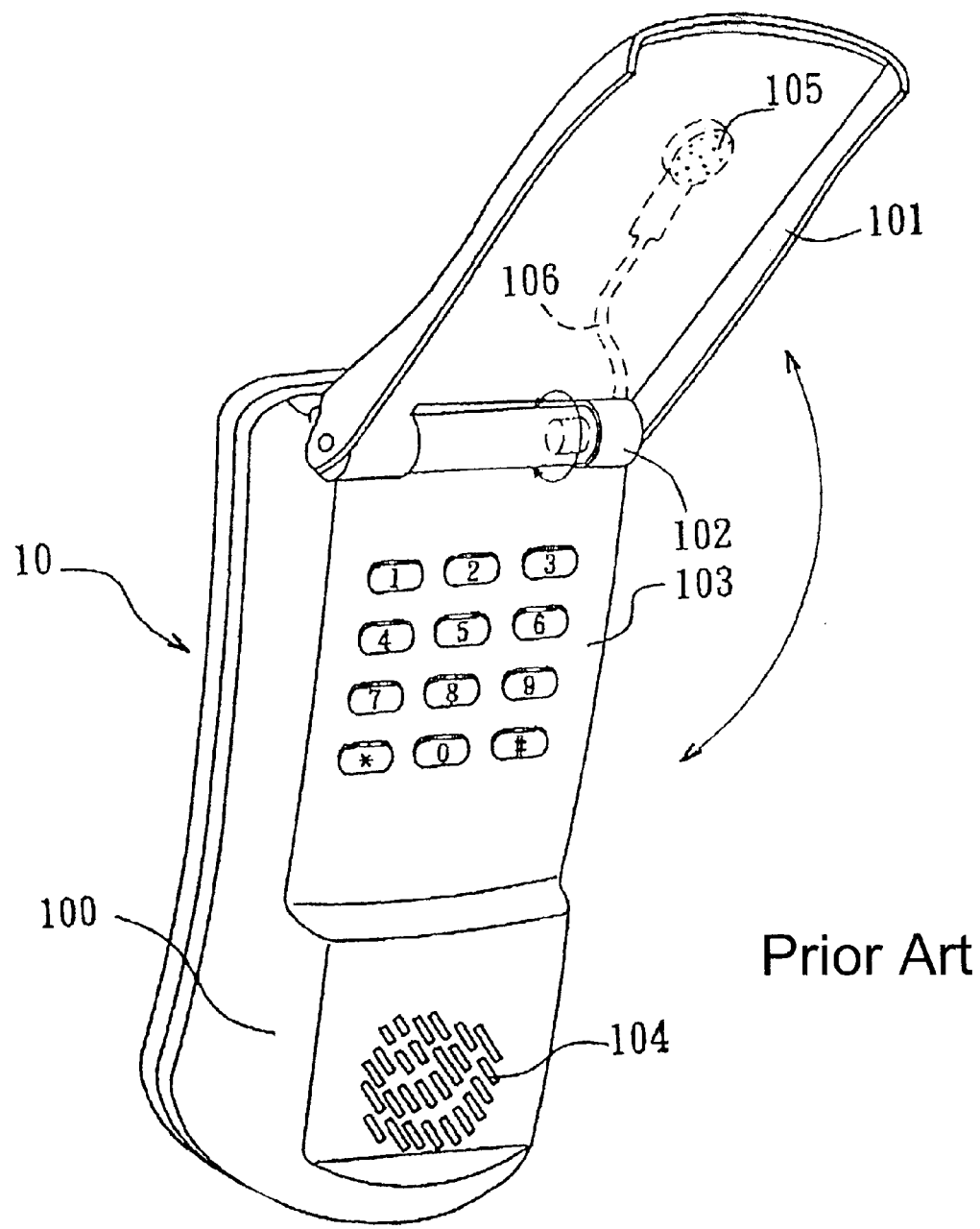
FIG. 1 is a schematic view of a first type of conventional mobile phone that uses a cable for connection.
Figure 2:
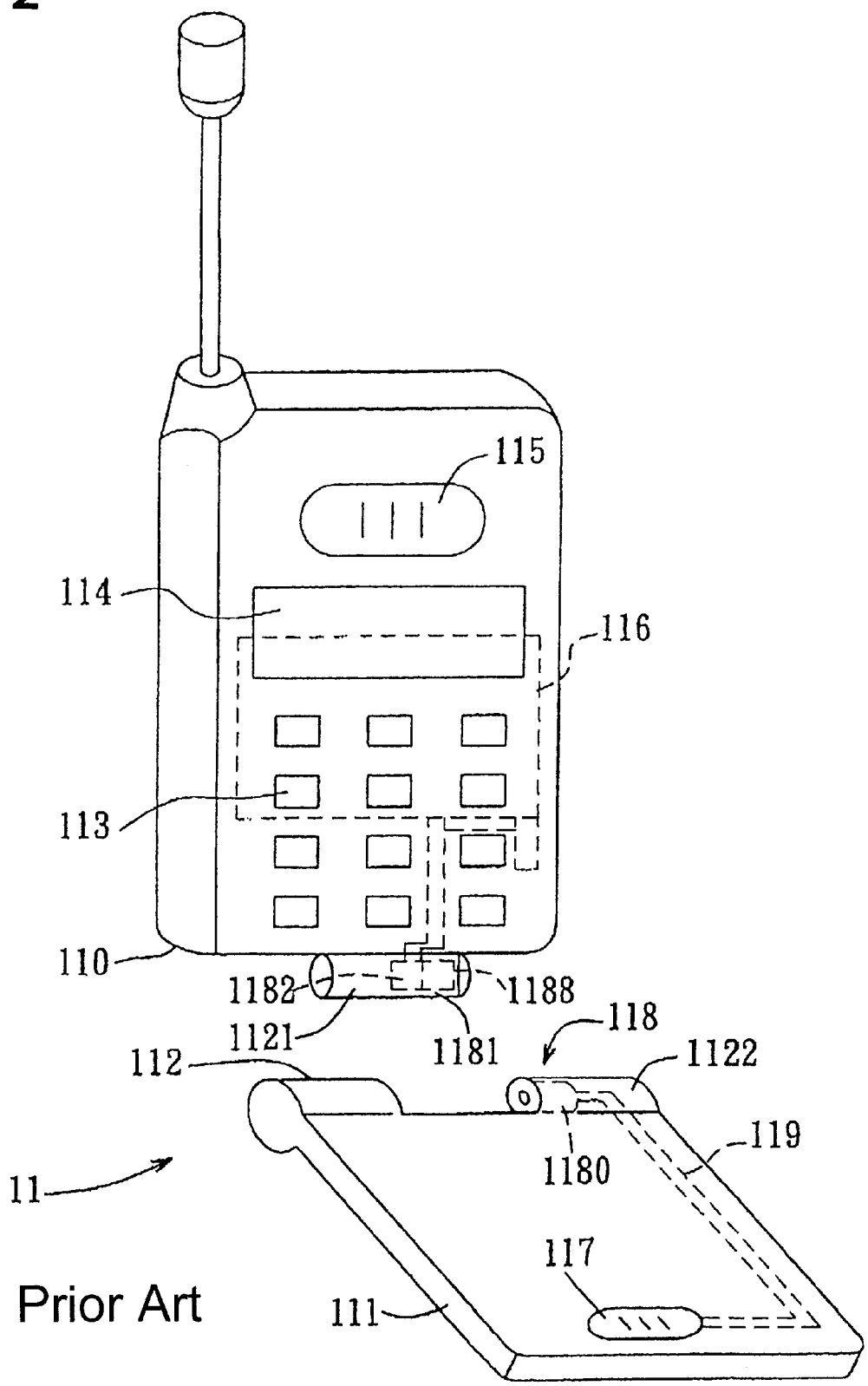
FIG. 2 is a schematic view of a second type of conventional mobile phone that uses a switch for connection.
Figure 3:
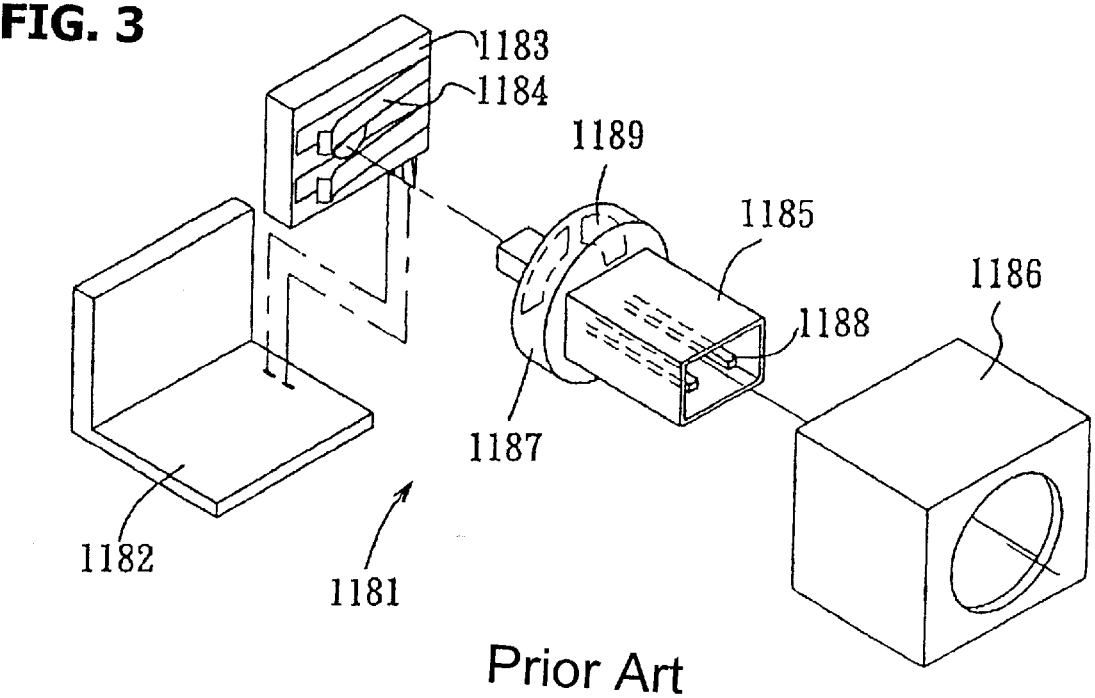
FIG. 3 is a schematic exploded view of the switch of FIG. 2.
Figure 4:
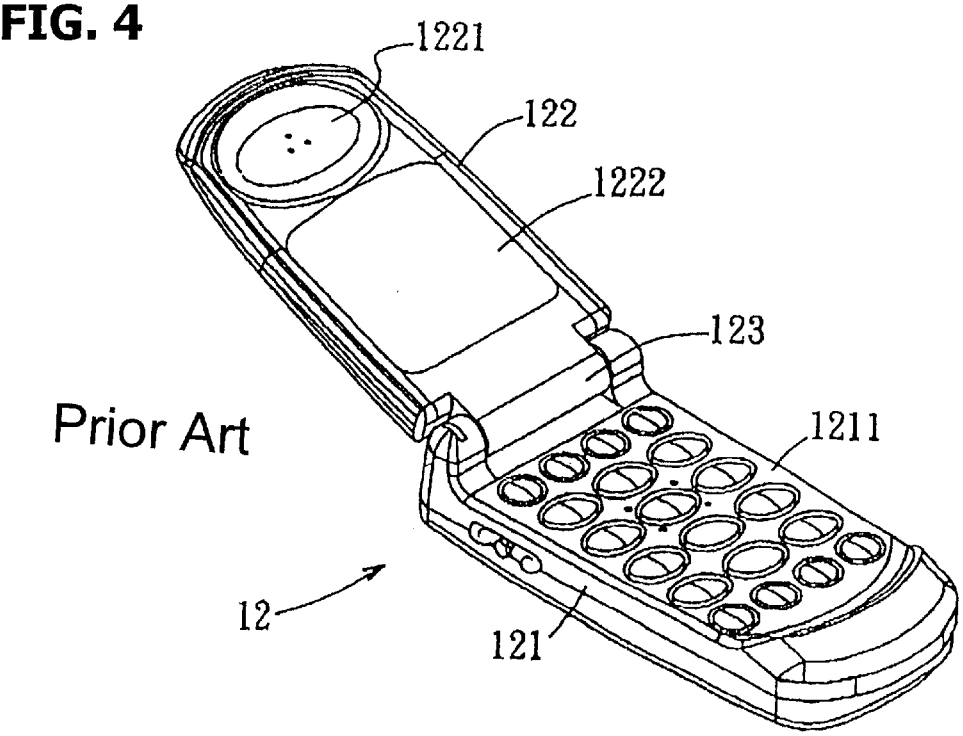
FIG. 4 is a schematic view of a third type of conventional mobile phone that uses a flexible printed circuit for connection.
Figure 5:
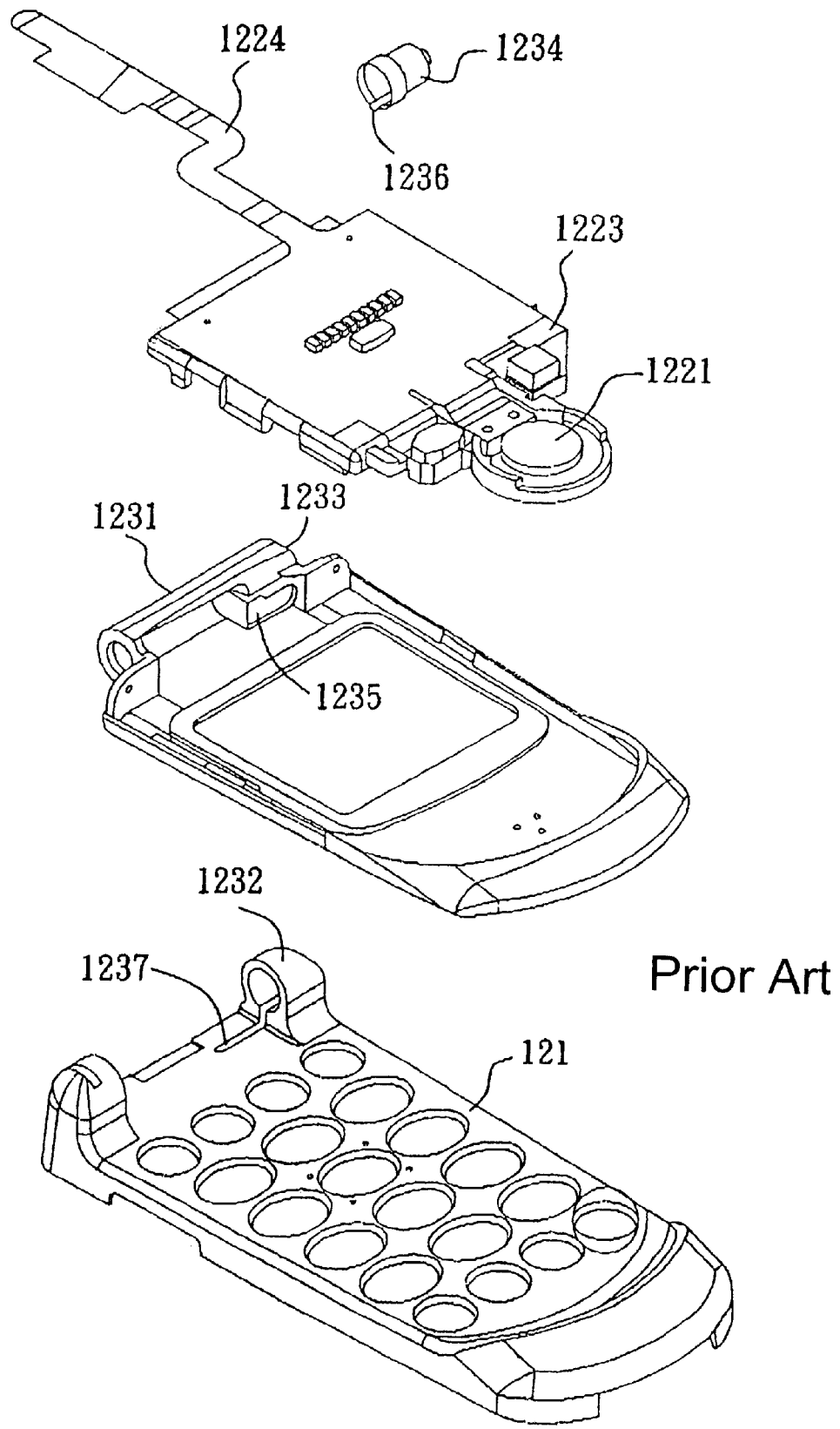
FIG. 5 is an exploded view of FIG. 4 in part.

The handheld type electronic device in the present invention is one that is formed by two housings which are folded toward each other, such as a mobile phone, personal digital assistant, portable computer, palmtop computer, or the like. For the sake of illustration, the present invention is exemplified using the mobile phone as an example in the following description of the embodiments. However, it should be apparent to those skilled in the art that the invention can be any other handheld electronic device and is not limited to the description of the following embodiments. In addition, like or similar elements are denoted by the same reference numerals in the following embodiments.

Figure 6:
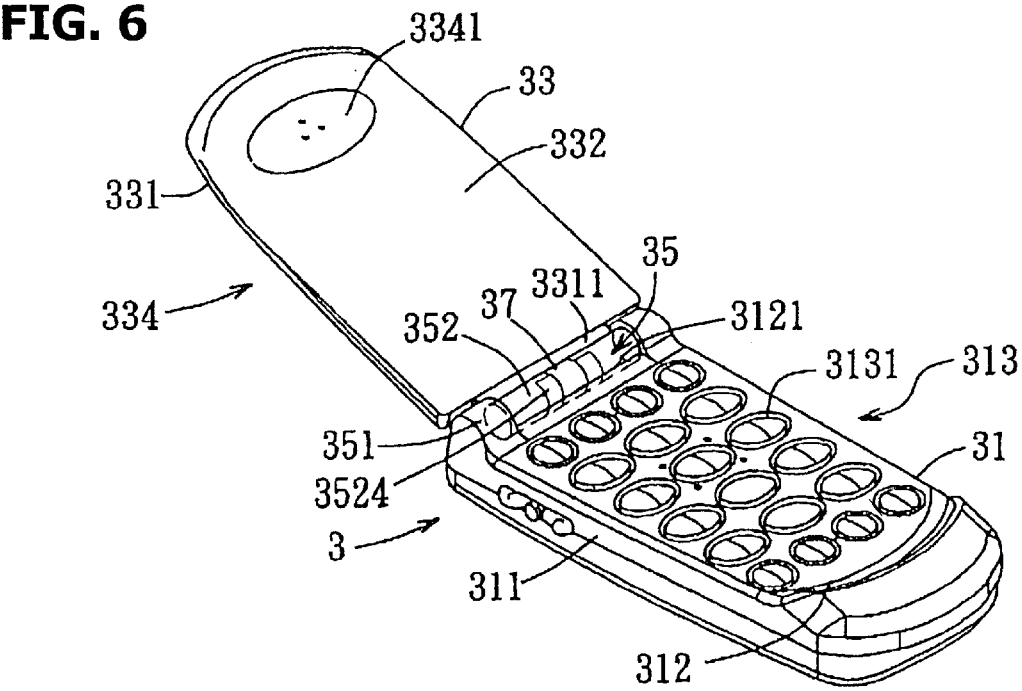
FIG. 6 is an assembled perspective view of the first preferred embodiment of this invention.

Reference is made to FIG. 6, which is a top view of a mobile phone in an open state. The mobile phone 3 has a first housing 31 and a second housing 33, a rotary device 35, and an electrical connector 37.

The first housing 31 includes an outer shell 311 and a first inner shell 312 covering the first outer shell 311 so as to form an enclosed receiving space (not shown). The first housing 31 has a first electronic system component 313 accommodated therein. The first electronic system component 313 includes a keypad portion 3131 insertably disposed in the first inner shell 312, and a circuit board (denoted by the reference numeral 3132 in FIG. 7) received in the first housing 31 and having a wireless communications function. It is noted that, although the first electronic system component is disclosed herein to include the keypad portion 3131 and the circuit board 3132 only, those skilled in the art should appreciate that the first electronic system component 313 may further include other circuit components having personal digital assistant functions and should not be limited to the description of this embodiment.

The second housing 33 includes a second outer shell 331 and a second inner shell 332 covering the second outer shell 331 to form an enclosed receiving space (not shown). The second housing 33 likewise has a second electronic system 334 accommodated therein to match the first electronic system component 313 so as to achieve the wireless communications function. The second electronic system component 334 includes a speaker 3341. It is noted that, although the electronic system component 334 in the second housing 33 is illustrated to include the speaker 3341 only, in practice, it may also include other electronic components, such as a display, etc., depending on actual design requirements, and should not be limited to the description of this embodiment.

The rotary device 35 includes a pivoting portion 352 which is disposed on one side of the second housing 33 and which is rotatable relative to and which is connected to the first housing 31, and a receiving portion 353. In this embodiment, with further reference to FIG. 7, the pivoting portion 352 includes two rotary shafts that are spacedly disposed on a side 3311 of the *second outer shell 331 proximate to the first housing 31, and the space between the two rotary shafts 352 defines a receiving portion 353 for receiving the electrical connector 37 so as to form a co-axial rotary shaft. Furthermore, as shown in FIG. 6, two corner edges of a side 3121 of the first inner shell 312 of the first housing 31 which is proximate to the second housing 33 are respectively provided with support portions 351 projecting therefrom at positions corresponding to the two rotary shafts 352 for pivotal connection with the two rotary shafts 352 such that the rotary device 35 can be mounted between the two support portions 351, thereby enabling the second housing 33 to rotate relative to the first housing 31. In this embodiment, the side 3121 of the first inner shell 312 of the first housing 31 further forms a curved smooth groove (see FIG. 7) to match the two rotary shafts 352.

Figure 8:
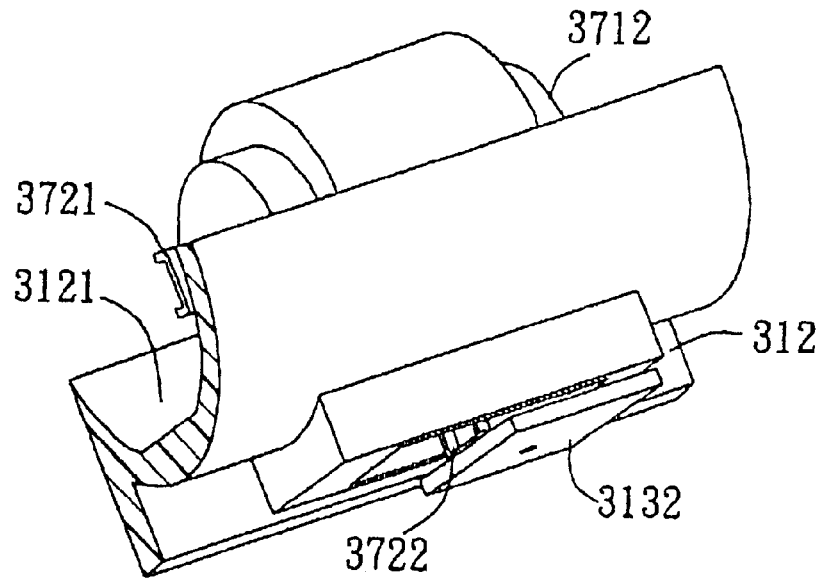
FIG. 8 is an assembled schematic view of FIG. 7 in part.

With further reference to FIG. 8, the electrical connector 37 is rotatably disposed in the receiving portion 353 relative to the two rotary shafts 352 and secured on the side 3121 of the first housing 31, for electrical connection with the first and second electronic system components 3132, 3341 of the two housings 31, 33, respectively. Due to interference of the first housing 31 with respect to the electrical connector 37, when the second housing 33 rotates relative to the first housing 31, the electrical connector 37 will not move with the rotary device 35, thereby overcoming the problem of wear of the conventional connecting elements resulting from rotation with the rotary shafts.

Figure 7:
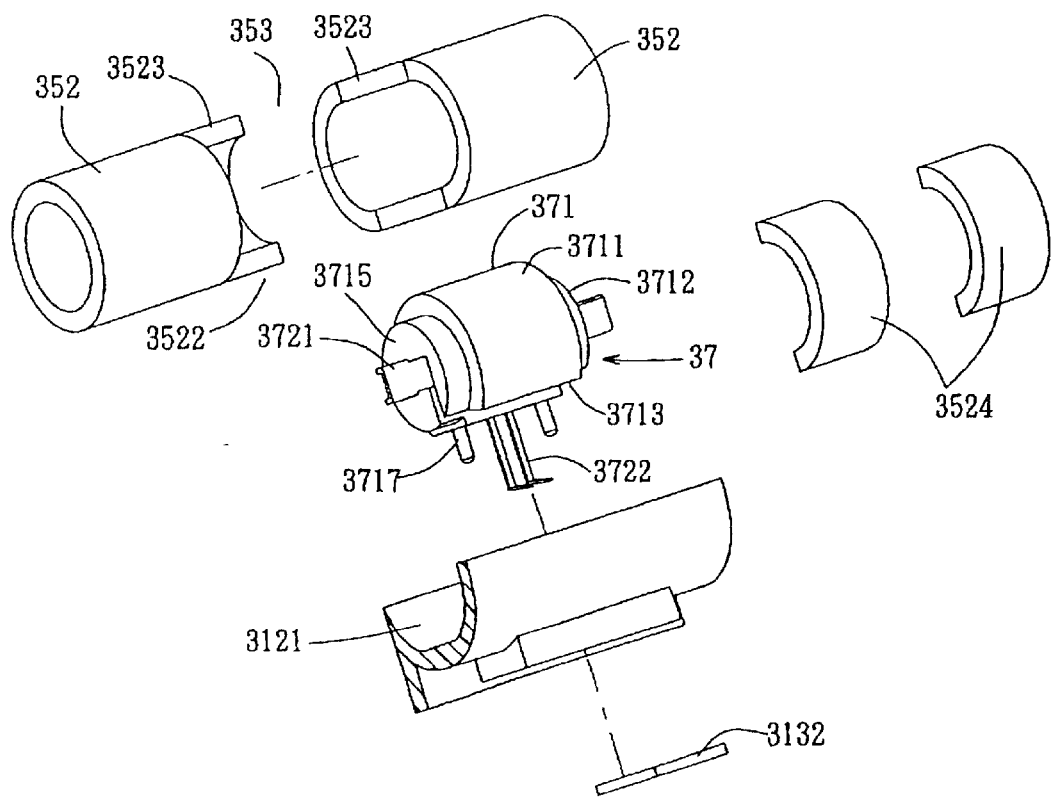
FIG. 7 is an exploded perspective view of the embodiment of FIG. 6.

As shown in FIG. 7, the electrical connector 37 is disposed in the receiving portion 353, and includes a generally cylindrical insulating casing 371 and two terminal channels 373 for terminals 372. The insulating casing 371 has a main body 3711 with a radius equivalent to the outer diameter of the two rotary shafts 352. In order to enhance positioning and protection of the electrical connector 37 in the receiving portion 353 of the rotary device 35, two end portions 3712 of the insulating casing 371 have shoulders having a radius smaller than the inner diameter of the two rotary shafts 352, and the difference in radius between the two end portions 3712 and the main body 3711 is not less than the thickness of the two rotary shafts 352 (i.e., the value of difference between the inner diameter and the outer diameter of the rotary shaft 352). In addition, peripheral portions of the end portions 3522 of the two rotary shafts 352 adjacent to the receiving portion 353 are partly removed so that each end portion forms, separately, a curved groove 3523 connected to the rotary shaft 352, and a shielding plate 3524 matching the shape of the curved groove 3523. In this embodiment, the curved groove 3523 is a generally hemispherical recess and the shielding plate 3524 is a generally hemispherical curved plate. Besides, since the curved grooves 3523 of the two rotary shafts 352 are disposed on one side 3311 of the second outer shell 331, the two shielding plates 3524 are disposed in the second inner shell 332 corresponding to the side 3311 of the second outer shell 331. As such, when the electrical connector 37 is disposed in the receiving portion 353, the two end portions 3712 of the insulating casing 371 will fall respectively into the two curved grooves 3523, and the two shielding plates 3524 are then used to respectively cover the two end portions 3712. Subsequently, by utilizing the groove 3121 of the first housing 31 to generate interference positioning (to be described hereinafter), the shielding plates 3524 and the insulating casing 371 can be positioned firmly between the two rotary shafts 352. Further, with reference to FIG. 6, the peripheries of the electrical connector 37, the two shielding plates, and the two rotary shafts 352 are co-planar to ensure smooth rotation of the rotary device 35. A peripheral portion of the insulating casing 371 which is adjacent to the groove 3121 of the first housing 31 is removed in part to form a flat surface 3713 confronting the groove 3121 of the first housing 31, and two positioning posts 3714 are disposed to extend downwardly from the flat surface 3713 (i.e., oriented toward the first housing 31). The two terminal channels 373 are passages that extend respectively from two end faces 3715 of the main body 3711 through the interior of the insulating housing 371, bend and extend to the flat surfaces 3713 such that when the terminals 372 are inserted into the respective terminal channels 373, they will respectively form a first contact portion 3721 and a second contact portion 3722 extending from the end face 3715 and the flat surface 3713, respectively. In this embodiment, the first contact portion 3721, which is a cup-shaped solder portion, and the second contact portion 3722 are disposed to be insertably connected to a connecting end of the circuit board 3132 in the first housing 31.

Figure 9:
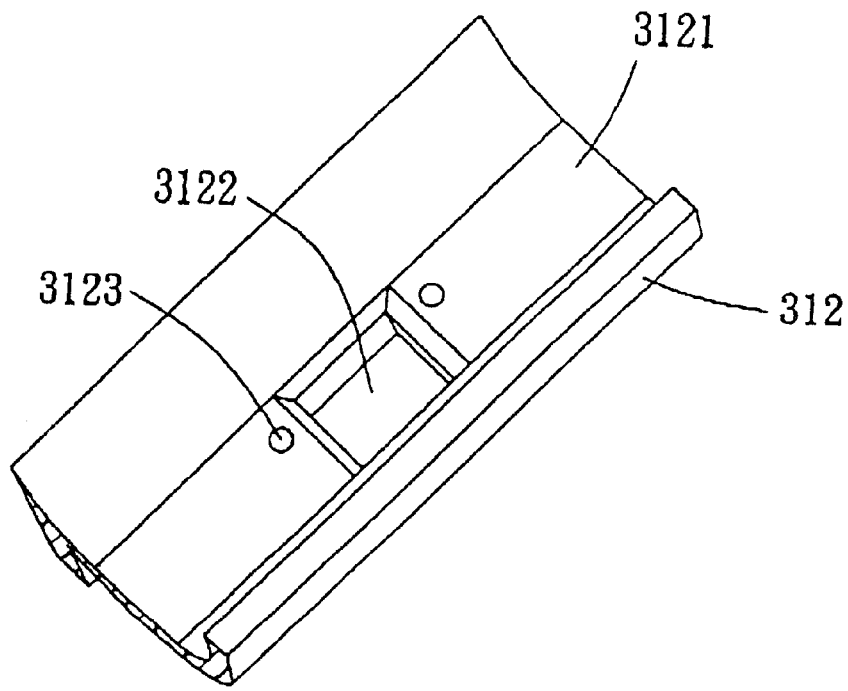
FIG. 9 is a schematic fragmentary view showing how a first housing is connected to one side of a second housing.

Furthermore, as shown in FIG. 9, a wall surface of the groove 3121 in the first inner shell 312 of the first housing 31 which faces the first electrical connector 37 is further formed with a rectangular opening 3122 for passage of the second contact portion 3722 of the electrical connector 37 therethrough, and two positioning holes 3123 disposed on both sides of the opening 3122 for passage of the positioning posts 3714 therethrough. As such, after the two terminals 372 are positioned in the terminal channels 373 of the insulating casing 371, one end of a lead wire 38 can be used to solder to the first contact portion 3721 of the corresponding terminal 372, with the other end thereof extending through the wall surface of the rotary shaft 352 into the second housing 33 so as to be electrically connected to the speaker 3341, and the second contact portion 3722 is insertably connected to the circuit board 3132 of the first housing 31 so as to electrically connect the speaker 3341 and the circuit board 3132 that are respectively disposed in different housings 31, 33. It is noted that, although the number of the terminals 371 and the form of the two contact portions 3721, 3722 of each terminal 371 are defined in this embodiment, the number of the terminals 371 can be adjusted depending on the designer's requirement, and the form of connection of the two contact portions 3721, 3722 may also be varied according to actual requirements. For instance, the first contact portion 3721 may be an insulation displacement terminal (IDT) or the second contact portion 3722 may be a surface-mount terminal. Hence, the invention should not be limited to the description of this embodiment.

Based on the foregoing, during assembly, the electrical connector 37 is disposed in the receiving portion 353, and the two shielding plates 3524 are disposed to cover the two end portions 3712 of the first insulating casing 371. Then, the rotary device 35 connected to the second housing 33 is mounted on the corresponding support portion 351 on the first housing 31, and the electrical connector 37 is disposed in the groove 3121 in the first inner shell 312, with the positioning posts 3713 of the first insulating casing 371 extending through the positioning holes 3123 to thereby position the entire assembly in the groove 3121 in the first inner shell 312. Therefore, by virtue of the interference between the positioning posts 3714 and the positioning holes 3123, and the interference among the walls of the groove 3121, the shielding plates 3524 and the insulating casing 371, the electrical connector 37 can be secured on the first inner shell 312 in the receiving portion 353 between the two rotary shafts 352, thereby preventing the electrical connector from rotating with the two rotary shafts 352 when the latter rotate.

Thus, when the second housing 33 rotates relative to the first housing 31 by means of the rotary device 35, as the electrical connector 37 is secured in the groove 3121 in the first housing 31 and will not rotate with the rotary shafts 352, rotation of the rotary device 35 will not result in occurrence of poor contact, so that electrical connection between the electronic system components 314, 334 of the two housings 31, 33 can be made stable via the electrical connector 37 of this embodiment, thereby achieving the effect of reducing the rate of malfunction of the mobile phone 3 and prolonging the service life of the mobile phone 3.

In order to enable more stable electrical connection between the lead wire which is electrically connected to the second electronic system component 334 with the terminals 372 of the electrical connector 37, in this embodiment, a recessed, axially-extending passage 374 is further provided at the end face 3715 of the insulating casing 371 proximate to the first contact portion 3721 of the terminal 372 such that, after the lead wire 38 is soldered to the first contact portion 3721 of the terminal 372, the lead wire 38 is bent to form a bent section 381, which is then disposed and positioned in the passage 374 for electrical connection to the speaker 3341. As such, when the lead wire 38 is slightly pulled due to opening and closing of the second housing 33, such an undue force will be offset by the stress generated at the bent section 381 of the lead wire 38 to stabilize the electrical connection between the lead wire 38 and the terminal 372, thereby reducing the rate of malfunctioning of the product and prolonging the service life of the product.

Furthermore, as users of mobile phones today are often after fashion and chic, manufacturers launch mobile phones that allow users to change the second housing 33 by themselves. Therefore, if the electrical connector 37 can be electrically connected to the circuit board 3132 through connection of an adapter that can be timely separated and that is not directly secured to the circuit board 3132, the second housing 33 can permit the user to change different styles of housings anytime depending on his/her needs to thereby conform to the current trend to chase after new gadgets. Therefore, disclosed hereinbelow are embodiments of the present invention in which the second housing 33 can be separated from the first housing 31 conveniently.

Figure 10:
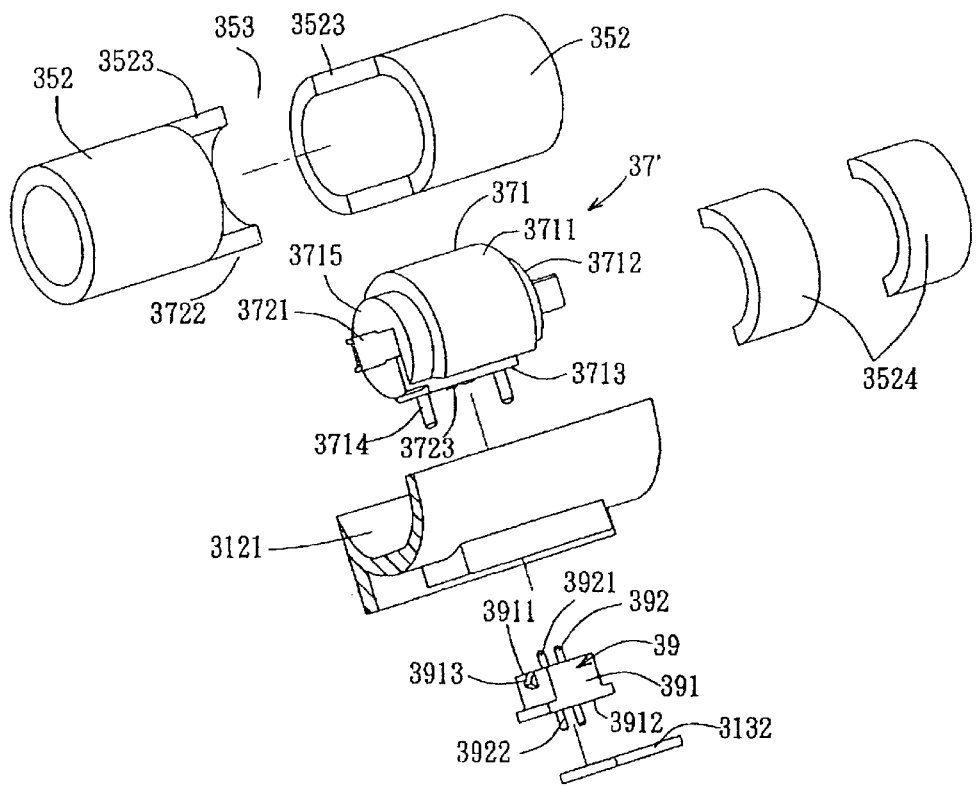
FIG. 10 is an exploded perspective view of the second preferred embodiment of this invention.
Figure 11:
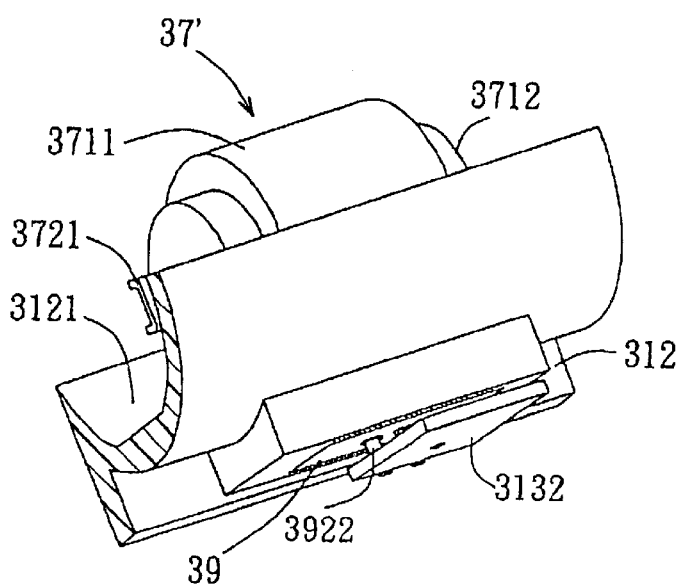
FIG. 11 is an assembled schematic view of FIG. 10 in part.
Figure 12:
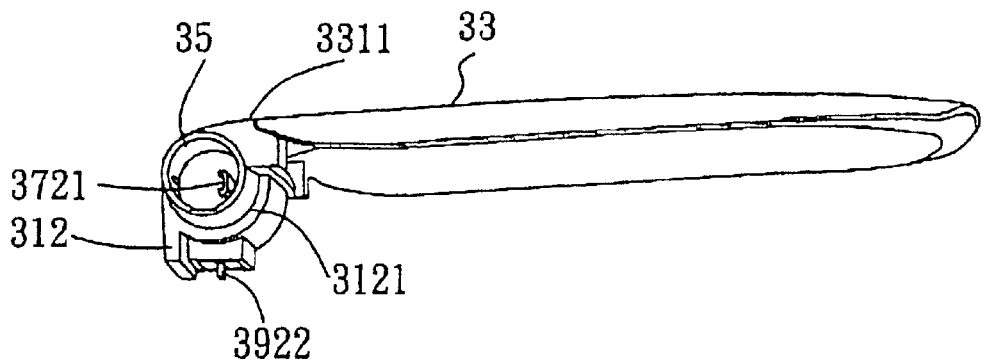
FIG. 12 is an assembled side view of the embodiment of FIG. 10.

Reference is made to FIG. 10, which illustrates the second embodiment. The mobile phone 3 in this embodiment further includes an adapter 39, and the second contact portions 3723 of the terminals 372' of the electrical connector 37' are contact pieces disposed contiguous to the flat surface 3713. The adapter 39 has a rectangular insulating housing 391 and two terminal channels (not shown) for receiving terminals 392. In this embodiment, the adapter 39 is a press-type adapter such that each terminal 392 has a first conducting portion 3921 and a second conducting portion 3922 which are exposed from top and bottom sides 3911, 3912 of the insulating housing 391, respectively, and which can reciprocate upward and downward with pressure. The two first conducting portions 3921 correspond to the second contact portions 3723 of the electrical connector 37' in position, whereas the two second conducting portions 3922 correspond to corresponding conductive contacts on the circuit board 3132 within the first housing 31. As such, referring to FIG. 11, during assembly, The top side 3911 of the adapter 39 is oriented toward the flat surface 3713 of the electrical connector 37' and is inserted into the opening 3122 such that the first conducting portions 3922 of the two terminals 392 of the adapter 39 will abut against and correspond to the second contact portions 3723 of the terminals 372' of the electrical connector 37'. In this embodiment, two interference blocks 3913 are further disposed to transversely project from two sides of the insulating housing 391 of the adapter 39 at suitable positions so as to urge against the walls of the opening 3122 during assembly such that, after assembly, the abutment between the interference blocks 3913 and the opening 3122 can be utilized to ensure firm positioning of the adapter 39 in the opening 3122. In this embodiment, referring to FIG. 11 showing the electrical paths of the electronic system components 3132, 3341 respectively disposed in the two housings 31, 33, the speaker in the second housing 33 can be electrically connected via the lead wire to the first contact portions 3721 of the terminals 372' of the electrical connector 37', and can be electrically connected to corresponding contacts on the circuit board 3132 via the second contact portions 3721 of the electrical connector 37' and the first conducting portion 3921 and the second conducting portion 3922 of the adapter 39.

Figure 13:
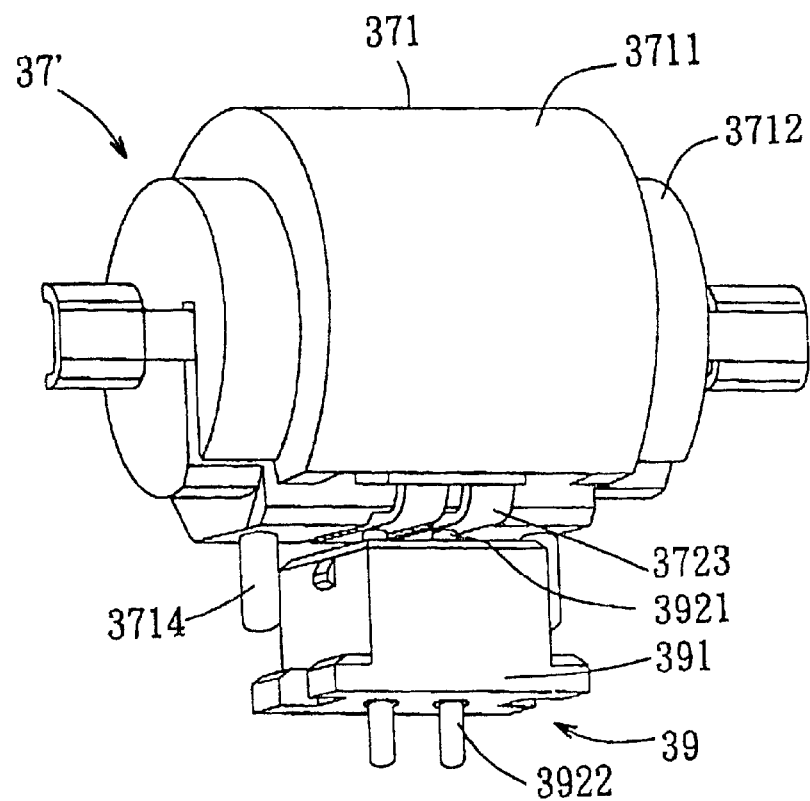
FIG. 13 is an assembled schematic view of the embodiment of FIG. 10.

Based on the foregoing, as shown in FIG. 13, when the electrical connector 37' is positioned in the groove 3121 in the first housing 31, the first conducting portions 3921 of the adapter 39 automatically abut against the second contact portions 3723 of the electrical connector 37' to thereby establishing electrical connection between the electrical connector 37' and the adapter 39. As such, when it is desired to replace the second housing 33, it is only necessary to release the pivotal connection between the rotary shafts 352 and the support portions 351 to hence break the electrical connection between the electrical connector 37' and the adapter 39, thereby achieving the object of facilitating change of the second housing 33 by the user himself/herself. In addition, when the second housing 33 rotates relative to the first housing 31 via the rotary device 35, since the electrical connector 37' in this embodiment is also secured in the groove 3121 in the first housing 31, it will not rotate with the rotary shafts 352. Therefore, the effects of stable electrical connection, reduced rate of malfunctioning of the mobile phone 3, prolonged service life of the mobile phone 3, etc., that are mentioned in the aforesaid embodiment can also be achieved.

It is noted that, although the form of connection between the electrical connector 37' and the adapter 39 and the type of their respective terminals have be defined hereinabove, in actual practice, the respective terminals 372', 392 of the electrical connector 37' and the adapter 39 are not limited to the above description so long as they can achieve electrical interconnection. In the succeeding paragraphs, different forms of connection between different types of electrical connectors 37" and adapters 39', 39" will be disclosed.

Figure 14:
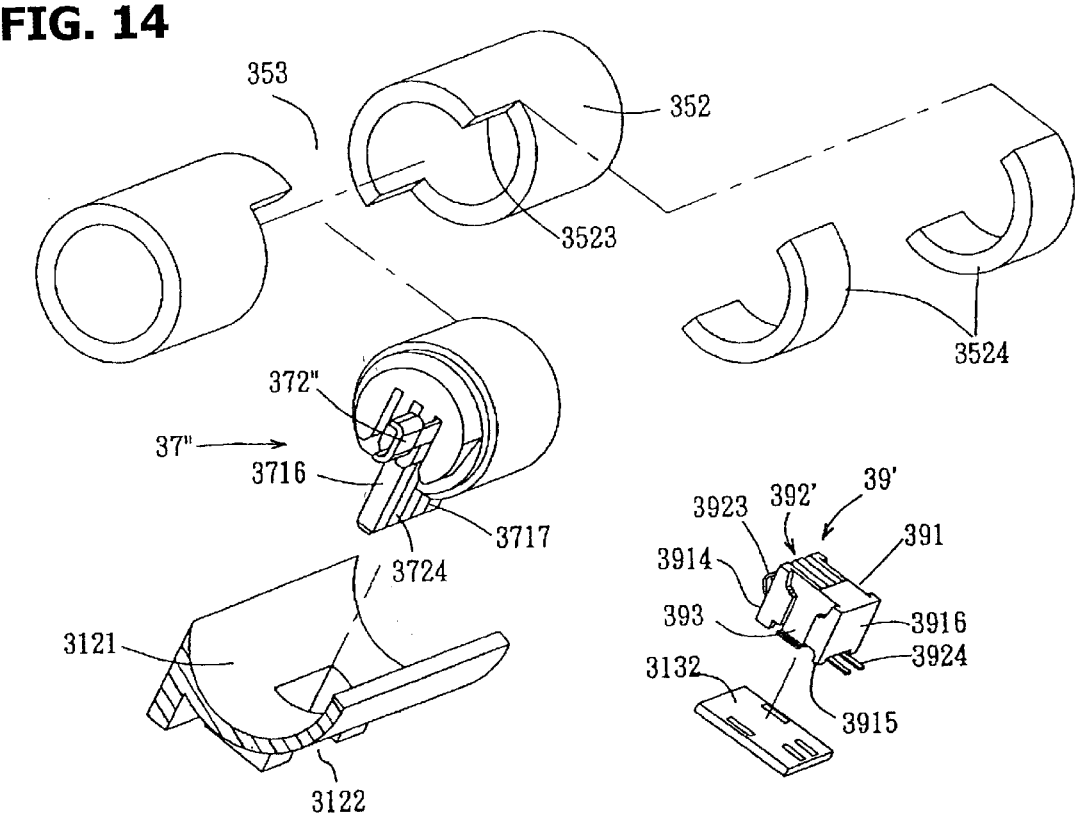
FIG. 14 is an exploded perspective view of the third embodiment of this invention.
Figure 15:
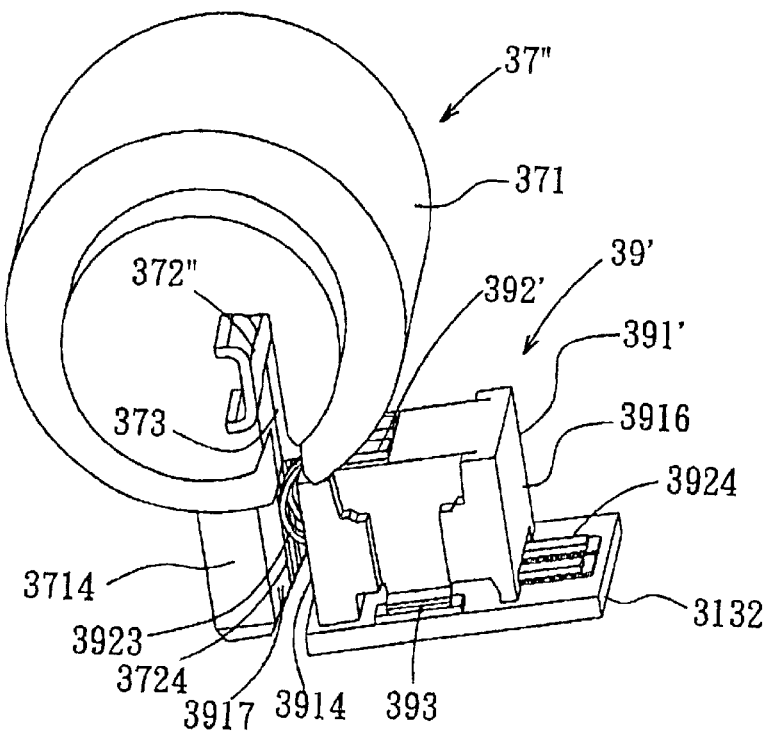
FIG. 15 is an assembled schematic view of the embodiment of FIG. 14 in part.

Furthermore, reference is made to FIG. 14, which illustrates the third embodiment of this invention. This embodiment differs from the second embodiment in that the side of the electrical connector 37" which faces the groove 3121 in the first inner shell 312 of the first housing 31 has a rectangular plate 3716 extending downwardly therefrom, whereas the second contact portions 3724 of the two terminals 372" of the electrical connector 37" lie flatly against the surface of the rectangular plate 3716 and extend side-by-side downwardly so as to extend via the opening 3122 in the first inner shell 312 into the receiving space of the first housing 31. Furthermore, referring further to FIG. 15, the first conducting portions 3923 of the two terminals 392' of the adapter 39' are elastic arms which from a side 3914 of the insulating housing 391' which is contiguous to the surface 3717 of the electrical connector 37" to correspond to the second contact portions 3724 in position so as to compress and connect with the second contact portions 3724, and the second conducting portions 3924 are horizontal connecting pins which extend along a bottom side 3915 of the insulating housing 391' from the other side 3916 that is opposite to the first conducting portions 3912 so as to be surface mounted on the conductive contacts on the circuit board 3132'. In addition, in this embodiment, in order to facilitate positioning of the adapter 39' on the circuit board 3132', there are further provided a positioning post 3919 which extends downwardly from the bottom side 3915 of the insulating housing 391', and a corresponding through hole in the circuit board 3132'. By means of the cooperation between the positioning post 3919 and the through hole 3133' for correct positioning, the effect of facilitated assembly can be achieved. Moreover, in order to further secure the adapter 39' on the circuit board 3132', two opposite sides of the adapter 39' are formed with wings 393 adapted to lie flatly against the circuit board 3132' so that the adapter 39' can be better secured on the circuit board 3132' by soldering the wings 393 onto the circuit board 3132'. In this embodiment, since the electrical connector 37' will not rotate with the rotary device 35 when the latter rotates, the advantages of easy replacement of the second housing 33, stable electrical connection, reduced rate of malfunctioning of components, and prolonged service life provided by the aforesaid embodiments can also be achieved.

Figure 16:
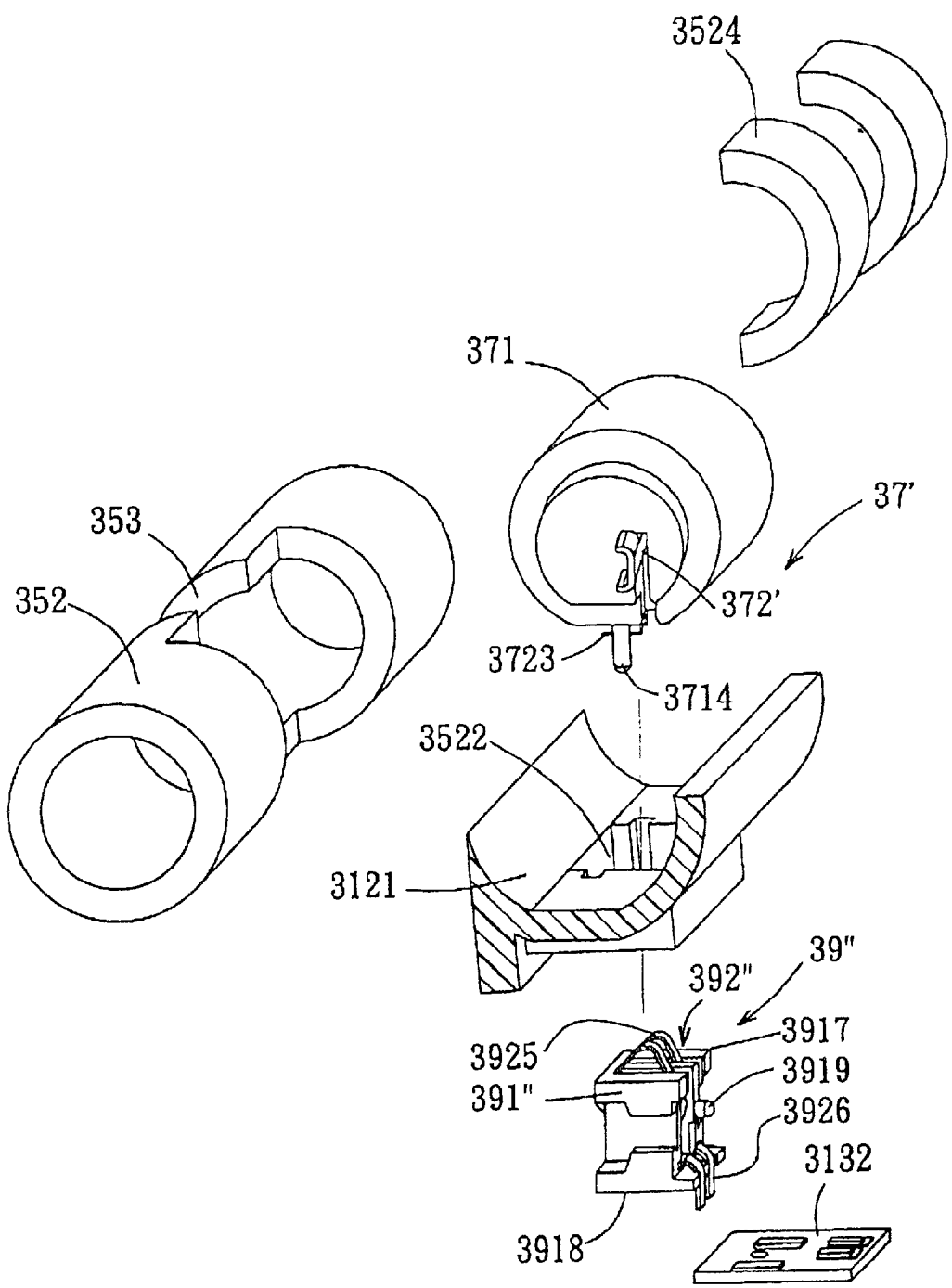
FIG. 16 is an exploded perspective view of the fourth embodiment of this invention.
Figure 17:
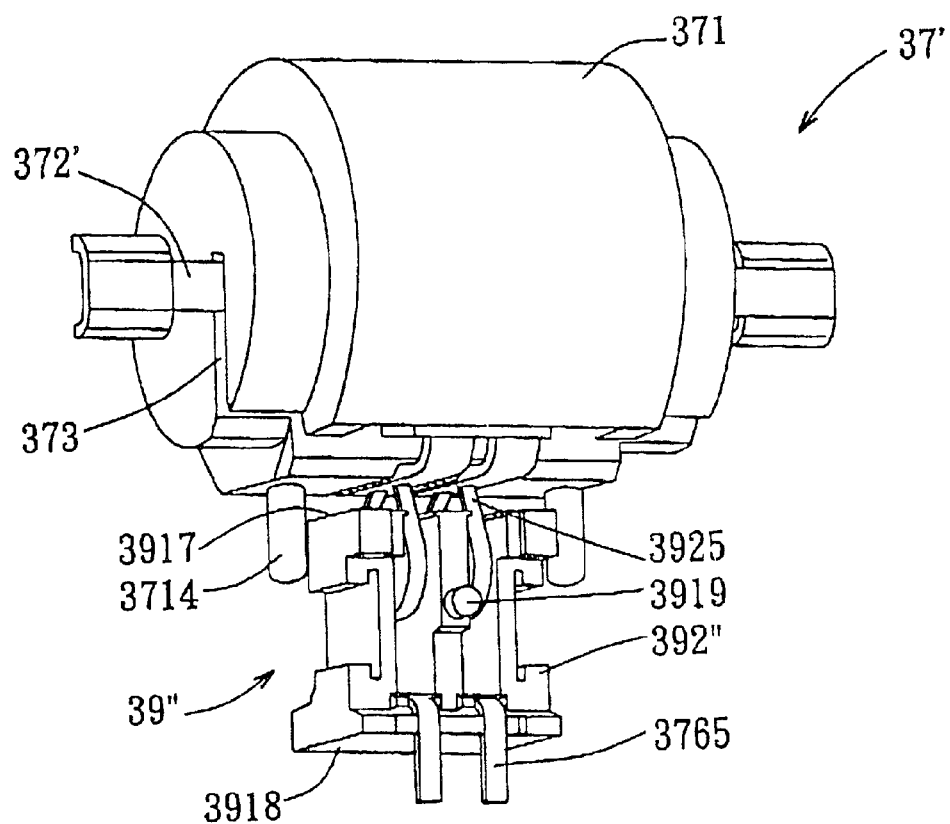
FIG. 17 is an assembled schematic view of the embodiment of FIG. 16 in part.
Figure 18:
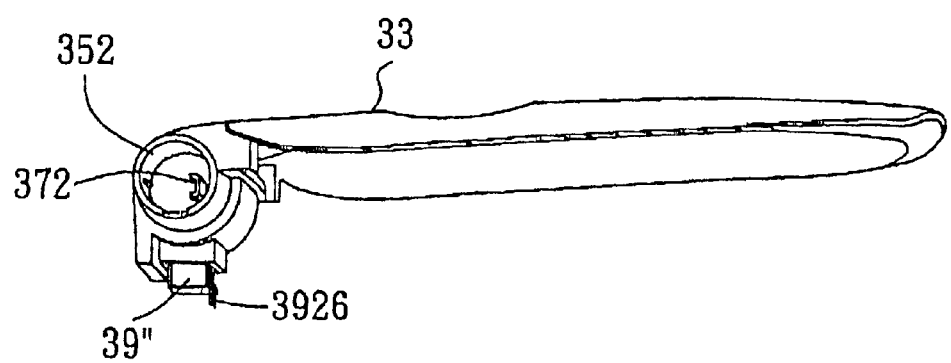
FIG. 18 is an assembled side view of the embodiment of FIG. 16.

Referring to FIG. 16, the fourth embodiment of this invention is shown to be different from the aforesaid second embodiment in the form of the terminals 392" of the adapter 39". With further reference to FIGS. 17 and 18, the first conducting portions 3925 of the two terminals 392" of the adapter 39" are elastic arms which bulge upwardly from the top side 3917 of the insulating housing 391 and which correspond to the second contact portions 3723 of the electrical connector 37' in position (as shown in FIG. 17) so as to urge against each other to establish electrical connection, whereas the second conducting portions 3926 extend vertically downward from the bottom side 3918 to insertably connect with the corresponding conductive contacts on the circuit board 3132". In this embodiment, since the electrical connector 37' will not rotate with the rotary device 35 when the latter rotates, the advantages of convenient replacement of the second housing, stable electrical connection, reduced rate of malfunctioning of components, and prolonged service life provided by the aforesaid embodiments can also be achieved.

It is noted that, and it can be appreciated from the aforesaid embodiments that, defining the form of the electrical connector and the adapter and the number of terminals is for the sake of illustration only. Those skilled in the art should understand that the form of the electrical connector and the adapter can be varied depending on actual requirements so long as they do not rotate with the rotary shafts 352 and the electronic system components within the two housings 31, 33 can be electrically interconnected. The number of the terminals can also be varied according to needs, and should not be limited to the description of this embodiment.

It is noted that, although the handheld electronic device according to the present invention is illustrated using the mobile phone as an example, it should be apparent to those skilled in the art that the present invention can be applied to other flip-type electronic devices, such as personal digital assistants, palmtop computers, portable computers, etc., and is not to be limited to the embodiments described herein.

It is noted that the aforesaid drawings and description are intended to illustrate the embodiments of the present invention and not to limit the present invention. Any equivalent arrangements or modifications made within the scope of the features of the present invention by any person skilled in the art should be deemed to fall within the scope of the claims of the subject application.

What is claimed is:

1. A handheld type electronic device, comprising:

first and second housings respectively accommodating first and second electronic system components therein;

a rotary device which include a pivoting portion and a receiving portion, said pivoting portion being disposed on one side of said second housing and being rotatably connected to a corresponding side of said first housing;

an electrical connector which includes an insulating casing which has a plurality of terminal channels disposed therein to receive terminals, each of said terminals having at least one first contact portion and at least one second contact portion formed from a single rigid piece of metal to respectively and electrically connect with said second electronic system component and said first electronic system component, said electrical connector being disposed in said receiving portion of said rotary device and being confined within said first housing such that, when said second housing rotates relative to said first housing via said pivoting portion of said rotary device, said electrical connector which is confined within the first housing will not rotate therewith.

2. The handheld type electronic device as claimed in claim 1, wherein said pivoting portion of said rotary device includes two rotary shafts which are disposed apart from each other by a space, said space defining said receiving portion.

3. The handheld type electronic device as claimed in claim 2, wherein said corresponding side of said first housing has two corner edges respectively forming support portions which correspond to and which connect with said rotary shafts such that said rotary shafts are rotatable.

4. The handheld type electronic device as claimed in claim 3, wherein said corresponding side of said first housing forms a curved groove matching curvature of said rotary shafts, said insulating casing of said electrical connector having a circular main body matching the radius of said rotary shafts, and a securing portion connected to said main body and disposed to generate interference with said groove in said first housing so as to confine said electrical connector in said first housing.

5. The handheld type electronic device as claimed in claim 2, wherein said second housing has an outer shell and an inner shell matching said outer shell.

6. The handheld type electronic device as claimed in claim 5, wherein said two rotary shafts are disposed on one of said outer and inner shells, and respectively form curved grooves, two shielding plates being provided on the other one of said outer and inner shells to correspond to said curved grooves, respectively.

7. A handheld type electronic device, comprising:

first and second housings respectively accommodating first and second electronic system components therein;

a rotary device which include a pivoting portion including two rotating shafts which are disposed a part from each other by a space and a receiving portion, defined by said space, said pivoting portion being disposed on one side of said second housing and being rotatably connected to a corresponding side of said first housing, said corresponding side of said first housing having two corner edges respectively forming support portions which correspond to and which connect with said rotary shafts such that said rotary shafts are rotatable;

an electrical connector which includes an insulating casing which has a plurality of terminal channels disposed therein to receive terminals, each of said terminals having at least one first contact portion and at least one second contact portion to respectively and electrically connect with said second electronic system component and said first electronic system component, said electrical connector being disposed in said receiving portion of said rotary device and being confined within said first housing such that, when said second housing rotates relative to said first housing via said pivoting portion of said rotary device, said electrical connector which is confined within the first housing will not rotate therewith.

8. The handheld type electronic device as claimed in claim 7, wherein said first housing has a surface, a direction which is parallel to said surface being defined to be a horizontal direction, a direction which is perpendicular to said horizontal direction and an axial direction of said rotary shafts being defined as a vertical direction, said securing portion of said electrical connector including a plurality of positioning posts that extend along said vertical direction to be insertably disposed in a wall surface of said groove in said first housing.

9. The handheld type electronic device as claimed in claim 8, further comprising an adapter for electrically bridging said electrical connector and said first electronic system component, said adapter having an insulating housing and at least one terminal, said at least one terminal including a first conducting portion which can timely urge against the corresponding second contact portion of said electrical connector, and a second conducting portion connecting with said first electronic system component in said first housing.

10. The handheld type electronic device as claimed in claim 9, wherein said insulating housing of said adapter is rectangular in shape, a rectangular opening which matches the shape of said insulating housing being formed in said wall surface of said groove in said first housing in a position corresponding to said second contact portion of said electrical connector such that said adapter can be insertably disposed in said opening of said groove.

\* \* \* \* \*